US007870157B2

(12) United States Patent
Paval

(10) Patent No.: US 7,870,157 B2
(45) Date of Patent: Jan. 11, 2011

(54) SYSTEM AND METHOD FOR IMPLEMENTING A MANAGEMENT COMPONENT THAT EXPOSES ATTRIBUTES

(75) Inventor: Eugen Paval, Ronkonkoma, NY (US)

(73) Assignee: Computer Associates Think, Inc., Islandia, NY (US)

( * ) Notice: Subject to any disclaimer, the term of this patent is extended or adjusted under 35 U.S.C. 154(b) by 85 days.

(21) Appl. No.: 12/419,201

(22) Filed: Apr. 6, 2009

(65) Prior Publication Data

US 2009/0222836 A1   Sep. 3, 2009

Related U.S. Application Data

(62) Division of application No. 11/001,848, filed on Dec. 2, 2004, now Pat. No. 7,516,122.

(51) Int. Cl.
*G06F 17/30* (2006.01)

(52) U.S. Cl. ............... 707/790; 707/791; 707/793; 707/802; 707/803

(58) Field of Classification Search ........... 707/790, 707/791, 793, 802, 1, 100, 102, 103, 104, 707/999.001, 999.1, 999.102, 999.103, 999.104, 707/803

See application file for complete search history.

(56) References Cited

U.S. PATENT DOCUMENTS

| | | | | |
|---|---|---|---|---|
| 6,429,364 | B1 * | 8/2002 | Muraki et al. | 84/600 |
| 6,510,504 | B2 * | 1/2003 | Satyanarayanan | 711/170 |
| 6,560,613 | B1 * | 5/2003 | Gylfason et al. | 1/1 |
| 7,313,579 | B2 * | 12/2007 | Murotani | 1/1 |
| 7,516,122 | B2 * | 4/2009 | Paval | 1/1 |
| 2002/0162012 | A1 * | 10/2002 | Burnett et al. | 713/200 |
| 2003/0135663 | A1 * | 7/2003 | Duncan et al. | 709/321 |
| 2003/0188036 | A1 * | 10/2003 | Chen et al. | 709/310 |
| 2004/0107223 | A1 * | 6/2004 | Uno et al. | 707/200 |
| 2004/0168173 | A1 * | 8/2004 | Cohen et al. | 719/310 |
| 2006/0294039 | A1 * | 12/2006 | Mekenkamp et al. | 707/1 |

* cited by examiner

*Primary Examiner*—Wilson Lee
*Assistant Examiner*—Thanh-Ha Dang
(74) *Attorney, Agent, or Firm*—Pillsbury Winthrop Shaw Pittman LLP

(57) ABSTRACT

Software for providing a management interface comprises a descriptor file comprising at least one type for at least one resource and further comprising at least one attribute for each type. A management component associated with one of the resources describes at least one of the types. The management component is operable to provide a management interface exposing at least one of the attributes associated with each of the one or more types describing the resource.

6 Claims, 3 Drawing Sheets

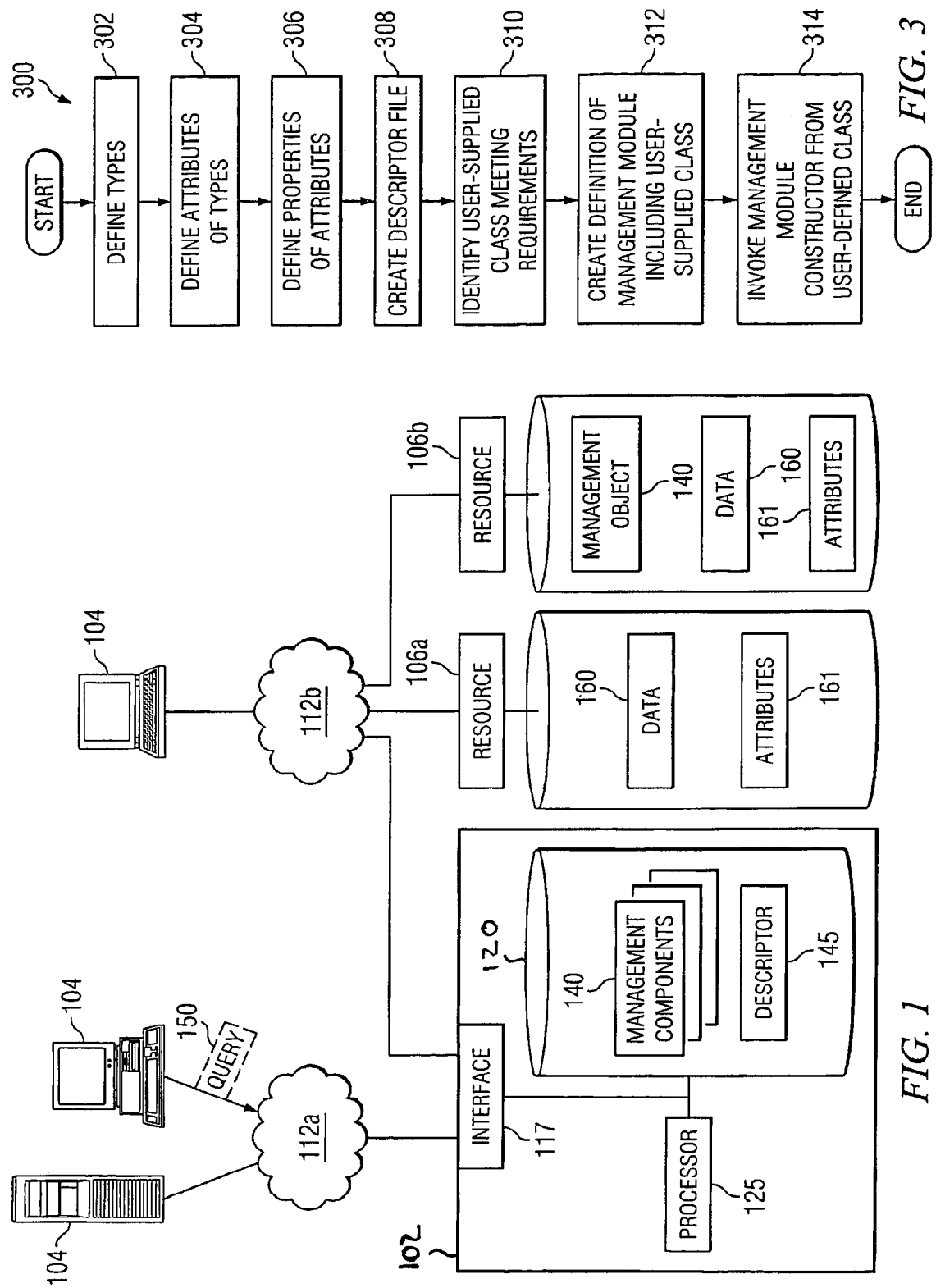

*FIG. 2A*

| NAME | TYPE | DESCRIPTION |
|---|---|---|
| FILES | TABLE | FILES AND FOLDERS IN A GIVEN FOLDER |
| CONFIGURE | COMMAND | CONFIGURES THE BROWSING AS RECURSIVE OR NOT |

*FIG. 2B*

| ENTITY | NAME | TYPE | AllowNull | DefaultValue |
|---|---|---|---|---|
| AutoIncSeed | AutoIncStep | ReadOnly | EXPRESSION | DESCRIPTION |
| FILES | NAME | CLASS java.lang.String | FALSE | NULL |
| 0 | 0 | FALSE | NULL | NULL |
| FILES | TYPE | CLASS java.lang.String | FALSE | NULL |
| 0 | 0 | FALSE | NULL | NULL |
| FILES | SIZE | CLASS java.lang.Integer | FALSE | NULL |
| 0 | 0 | FALSE | NULL | NULL |
| FILES | ReadOnly | CLASS java.lang.Boolean | FALSE | NULL |
| 0 | 0 | FALSE | NULL | NULL |
| FILES | HIDDEN | CLASS java.lang.Boolean | FALSE | NULL |
| 0 | 0 | FALSE | NULL | NULL |
| FILES | LastModified | CLASS java.util.Date | FALSE | NULL |
| 0 | 0 | FALSE | NULL | NULL |
| FILES | PARENT | CLASS java.lang.String | FALSE | NULL |
| 0 | 0 | FALSE | NULL | NULL |
| FILES | SizeMB | CLASS java.lang.Double | FALSE | NULL |
| 0 | 0 | FALSE | NULL | SIZE/1048576 |
| CONFIGURE | RECURSIVE | CLASS java.lang.Boolean | FALSE | NULL |
| 0 | 0 | FALSE | NULL | NULL |

SYSTEM AND METHOD FOR IMPLEMENTING A MANAGEMENT COMPONENT THAT EXPOSES ATTRIBUTES

CROSS-REFERENCE TO RELATED APPLICATIONS

This application is a divisional application of U.S. patent application Ser. No. 11/001,848, filed Dec. 2, 2004, now U.S. Pat. No. 7,516,122.

TECHNICAL FIELD

This disclosure generally relates to computer resource management and, more specifically, to a system and method for implementing a management component that exposes attributes.

BACKGROUND

Computer systems may implement distributed applications in which components may be physically located on separate machines or logically located in remote segments or environments. Often, such components may communicate with one another using protocols, which facilitate the exchange of data and metadata. At a high level, such a protocol may be considered one form of an Application Programming Interface (API). APIs are often customized for specialized components, and across an enterprise, a number of different APIs may be used on multiple platforms. Such APIs may be difficult to modify and it may become necessary or beneficial to use a plurality of different APIs in a hierarchy of managed resources. Certain systems implement or utilize technology including management beans ("MBeans"), which are stand-alone Java objects that provide a management interface for a particular component.

SUMMARY

This disclosure provides a system and method for providing defining and implementing a management component. For example, software for providing a management interface comprises a descriptor file comprising at least one type for at least one resource and further comprising at least one attribute for each type. A management component associated with one of the resources describes at least one of the types. The management component is operable to provide a management interface exposing at least one of the attributes associated with each of the one or more types describing the resource. The details of one or more embodiments of the disclosure are set forth in the accompanying drawings and the description below. Particular features, objects, and advantages of the disclosure will be apparent from the description and drawings and from the claims.

DESCRIPTION OF DRAWINGS

FIG. 1 illustrates a distributed application environment in accordance with one embodiment of the present disclosure;

FIGS. 2A and 2B are tables illustrating examples of file types, attributes, and properties;

FIG. 3 is a flowchart illustrating a example method for programming a management component.

DETAILED DESCRIPTION

Figure 4:
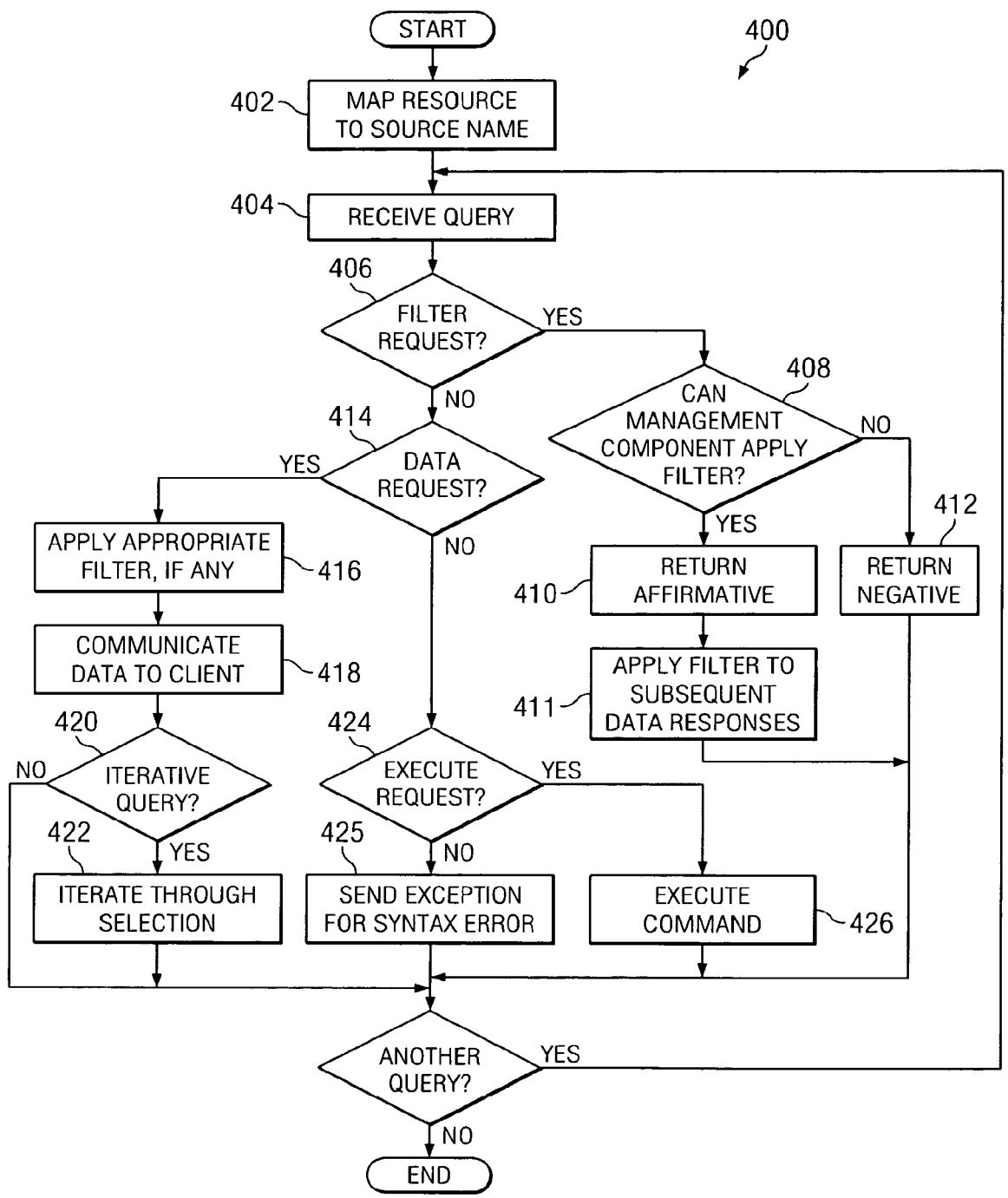
FIG. 4 is a flowchart illustrating an example method of operation for a management component.

FIG. 1 illustrates a distributed application environment 100 for at least a portion of enterprise or data processing environment in accordance with an embodiment of the present disclosure. At a high level, environment 100 represents a relational application domain model and includes or is communicably coupled with some or all of server 102, one or more clients 104, and a plurality of data resources 106. For example, distributed application environment 100 may include server 102 that is operable to receive a Structured Query Language (SQL) query 150 from a user of one of the clients 104, convert query 150 to an object-oriented request associated with at least one of the data resources 106 referencing or storing data 160 requested by query 150, and execute the object-oriented request on the appropriate resource 106. Therefore, distributed application environment 100 may provide substantially uniform access to metadata exposed by agents associated with data resources 106. Put another way, server 102 may provide a SQL interface or other Application Programming Interface (API) for applications executing on clients 104 to resources 106. As used herein, "SQL" describes or includes any of the plurality of versions of the SQL relational database query and manipulation language such as, for example, SEQUEL, ANSI SQL, any other proprietary or public variant of SQL, or other suitable or generic database query language (XML). Distributed environment 100 may be a distributed client/server system that allows users of clients 104 to submit queries 150 for execution on any of the plurality of external resources 106. But environment 100 may also be a standalone computing environment or any other suitable environment, such as an administrator accessing data stored on server 102, without departing from the scope of this disclosure. For example, resources 106 may be distributed across a plurality of virtual or logical partitions resident on server 102. The term "dynamically," as used herein, generally means that certain processing is determined, at least in part, at run-time based on one or more variables. The term "automatically," as used herein, generally means that the appropriate processing is substantially performed by at least part of distributed application environment 100. It should be understood that "automatically" further contemplates any suitable administrator or other user interaction with environment 100 without departing from the scope of this disclosure.

Returning to the illustrated embodiment server 102 includes memory 120 and processor 125 and comprises an electronic computing device operable to receive, transmit, process and store data associated with environment 100. For example, server 102 may be any computer or processing device such as a mainframe, a blade server, general-purpose personal computer (PC), Macintosh, workstation, Unix-based computer, or any other suitable device. Generally, FIG. 1 provides merely one example of computers that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 1 illustrates one server 102 that may be used with the disclosure, environment 100 can be implemented using computers other than servers, as well as a server pool. Server 102 may be adapted to execute any operating system 110 including z/OS, Linux-Intel or Linux/390, UNIX, Windows Server, or any other suitable operating system. According to one embodiment, server 102 may also include or be communicably coupled with a web server and/or an SMTP server.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 includes management components 140 and a descriptor file 145, but it may also include any other appropriate data such as a job history, a security or audit log, print or other reporting files, HTML files or templates, and others.

Management components 140 are any hardware, software, firmware, executables, objects, or other components associated with at least one data resource 106 and operable to provide a management interface between the associated resource or resources 106 and one or more clients 104. In particular, management components 140 are operable to selectively expose predetermined attributes 161 of particular types of resources 106 based on descriptor file 145, which defines types of resources 106 and attributes 161 associated with each type. In contrast, other systems may use reflection techniques in which the requested resource provides information about its own attributes according to its own internal criteria for the exposed attributes. Such reflection techniques often require large overhead and they can be difficult to incorporate into different APIs. By inversion of control (IoC) between management components 140 and resources 106 in exposing attributes, various embodiments of management components 140 allow for simplified management of resources 106 by controlling which attributes 161 are exposed for a particular type of resource 106. In addition to or as part of providing a management interface, each management objects 140 may perform such tasks as, for example, parsing queries, returning exceptions for query errors, dispatching queries to implementations of user provided code, iterating and/or sorting query results, and ensuring disposition of resources 106. In particular embodiments, management components 140 are instances of a user-supplied Java class that implements a desired interface.

Management components 140 in various embodiments may take numerous different forms. For example, each management component 140 may be further operable to call or execute Business Logic Layer (BLL) or Data Access Layer (DAL) logic as appropriate. In particular embodiments, management objects 140 may comprise an API implemented through a dynamic linked library (DLL), a daemon, an object, or other such software module, such as, for example, a management bean in a Java environment, including such environments as Java 2, Enterprise Edition (J2EE). Each management component 140 may be written or described in any appropriate computer language including C, C++, C#, Java, J#, Visual Basic, assembler, Perl, any suitable version of 4GL, and others or any combination thereof. It will be understood that while multiple management components 140 are illustrated in FIG. 1, the features and functionality performed by this engine may be consolidated within a single module as well. Indeed, the plurality of management components 140 may comprise sub-modules or DLLs of a parent application (not illustrated). Further, management components 140 may be collectively stored in one file or library or distributed across a plurality of files or libraries without departing from the scope of the disclosure. While illustrated as residing on server 102, each management component 140 may be also (or alternatively) be located or executed on the respective data resource 106. As used herein, "each" means one or all of a particular subset as appropriate.

Descriptor file 145 includes any parameters, variables, mappings, algorithms, instructions, rules or other policies for classifying resources 106 into types and defining or identifying attributes 161 associated with particular resource types. Descriptor file 145 may thus be used to allow management components 140 to interact with various resources 106 using a predetermined set of attributes 161, which then permits management components 140 to be more easily implemented in various environments and may also provide a more uniform management interface. In particular embodiments, descriptor file 145 may comprise one or more tables stored in a relational database describing types of files and associated attributes. Although illustrated as a single file, it should be understood that descriptor file 145 may be implemented in multiple files, some or all of which may be stored in memory 120 while others may be stored remotely from server 102 in various locations. Thus, in various embodiments, descriptor file 145 may store or define various data structures as text files, eXtensible Markup Language (XML) documents, Virtual Storage Access Method (VSAM) files, flat files, Btrieve files, comma-separated-value (CSV) files, internal variables, or one or more libraries. While illustrated separately, in a further embodiment, descriptor file 145 may be implemented as part of management modules 140. In short, descriptor file 145 may comprise one variable, table, or file or a plurality of variables, tables, or files stored on one computer or across a plurality of computers in any appropriate format. Moreover, all or a portion of descriptor file 145 may be local or remote to server 102 and may store any type of appropriate data without departing from the scope of this disclosure.

In a particular embodiment, descriptor file 145 classifies resources 106 into three example types: table, command, or event. Although, of course, resources 106 may be of any suitable type. The type "table" typically refers to any file with strongly typed arrangements of data. "Commands" generally refer to any resource 106 that performs, processes, or executes a task, such as in response to receiving an object-oriented query that includes parameters for the command. "Events" often provide notification of one or more activities taking place within environment 100. Each type typically has associated attributes 161. For example, the attributes of a table may include the table's columns, read-only status, open or closed status, and others. In another example, the attributes of a command may be the command's parameters, security options, errors, and others. In yet another example, the attributes of an event may characterize the information provided, referenced, or used by the event. Attributes may be further defined by properties of the attribute, such as the attribute name, an underlying Java type or class for the attribute an expression used to calculate the attribute's value, read-only status, a description of the attribute, and such. Other example attribute properties indicate whether the attribute can take a null value, whether it has a default value, and whether the variable increments (along with a starting value and increment step).

In various embodiments, the particular management module (or component) 140 associated with each resource 106 may maintain information characterizing the associated resource 106, including the type (i.e., table, command, or event), the name of the associated resource 106 (which may be used to define a namespace for attributes of the resource 106), a description of the associated resource 106, and various other forms of usable information, and may provide such information in response to query 150 from client 104. For example, management module 140 may expose get methods that allow client 104 to request the name, type, description, attributes, attribute properties, or any other suitable form of metadata. Such methods may be invoked in response to, for example, SQL select queries 150. Management module 140 also responds to select and execute queries associated with the type of resource 106, such as requests to provide data 160 or to execute a command at resource 106. In some cases, client 104 requires data 160 to be sorted, filtered, or otherwise processed and, therefore, management module 140 may incorporate or implement algorithms for filtering, sorting, computing, transforming, or otherwise processing data 160. In a particular embodiment, management module 140 is operable to respond to queries 150 requesting whether management module 140 can apply a particular filter or sorting algorithm and, if so, instructing management module 140 to apply such filters or sorting algorithms when returning data 160 to client 104.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes parsing engine 130, which performs at least a portion of the analysis or other processing of incoming SQL queries 150.

Server 102 may also include interface 117 for communicating with other computer systems, such as client 104, over network 112 in a client-server or other distributed environment. In certain embodiments, server 102 receives queries 150 from local or remote senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Indeed, while illustrated as two networks, 112a and 112b respectively, network 112 may be a continuous network without departing from the scope of this disclosure, so long as at least portion of network 112 may facilitate communications between senders and recipients of queries 150 and results 160. In other words, network 112 encompasses any internal and/or external network, networks, sub-network, or combination thereof operable to facilitate communications between various computing components in environment 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations.

Client 104 is any local or remote computing device operable to receive requests from the user via a user interface 116, such as a GUI, a CLI (Command Line Interface), or any of numerous other user interfaces. Thus, where reference is made to a particular interface, it should be understood that any other user interface may be substituted in its place. In various embodiments, each client 104 includes at least GUI 116 and comprises an electronic computing device operable to receive, transmit, process and store any appropriate data associated with environment 100. It will be understood that there may be any number of clients 104 communicably coupled to server 102. For example, illustrated clients 104 include one local client 104 and two clients external to the illustrated portion of enterprise 100. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers to submit or review queries 150 via GUI 116. As used in this disclosure, client 104 is intended to encompass a personal computer, touch screen terminal, workstation, network computer, kiosk, wireless data port, wireless or wireline phone, personal data assistant (PDA), one or more processors within these or other devices, or any other suitable processing device. For example, client 104 may comprise a computer that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104 through the display, namely GUI 116.

GUI 116 comprises a graphical user interface operable to allow the user of client 104 to interface with at least a portion of environment 100 for any suitable purpose. Generally, GUI 116 provides the user of client 104 with an efficient and user-friendly presentation of data provided by or communicated within environment 100. For example, GUI 116 may be a front-end of an application executing on client 104 that is operable to submit SQL queries 150 to one or more data resources 106. GUI 116 may comprise a plurality of customizable frames or views having interactive fields, pull-down lists, and buttons operated by the user. In one embodiment, GUI 116 presents information associated with queries 150 and buttons and receives commands from the user of client 104 via one of the input devices. Moreover, it should be understood that the term graphical user interface may be used in the singular or in the plural to describe one or more graphical user interfaces and each of the displays of a particular graphical user interface. Therefore, GUI 116 contemplates any graphical user interface, such as a generic web browser or touch screen, that processes information in environment 100 and efficiently presents the results to the user. Server 102 can accept data from client 104 via the web browser (e.g., Microsoft Internet Explorer or Netscape Navigator) and return the appropriate HTML or XML responses using network 112. For example, server 102 may receive such an SQL query 150 from client 104 using the web browser and then execute the parsed query in the appropriate one or more operating resources 106.

Environment 100 includes, references, or is communicably coupled with a plurality of data resources 106. Data resource 106 typically comprises a distributed application, data repository, web server, job queue, media service, file system agent, or any other target machine or process operable to store, retrieve, generate, or otherwise identify and collect data based on a received query 150, For example, resource 106 may include a plurality of services operable to communicate requested data 160 to data consuming services on client 104 based on queries 150 transformed by parsing engine 130. As illustrated by second resource 106b, resources 106 may also include a management file, object, or agent 140 residing on the target machine. It will be understood that the target machine or process may be remote or on-site; further, the target machine may represent a separate process or repository residing on server 102 without departing from the scope of this disclosure. In other words, data resource 106 is any module or component that receives queries 150 and retrieves data 160, normally (but not always) residing on the target machine, based on received query 150. In certain embodiments, some or all data resources 106 are each associated with an API or other object-oriented framework. Of course, two or more resources 106 may share the same API or may be compatible with identical frameworks without departing from the scope of the disclosure. Moreover, each data resource 106 may include one server or other computer or may be distributed across a plurality of computers. In certain embodiments, retrieved or communicated data 160 is in tabular format. In other embodiments, data 160 may be in XML format. Regardless of the particular format, data 160 is often operable to be normalized or self-describing. Once the data has been gathered, data resource 106 may communicate data 160 to server 102 or server 102 may retrieve data 160 from data resource 106, as appropriate.

In one example aspect of operation, server 102 receives a SQL query 150 from one of the communicably coupled clients 104. SQL query 150 requests the names and types of particular resources 106 associated with management module 140. Server 102 then parses query 150, and in response to query 150, management module 140 provides the names, types (as defined in descriptor file 145), and descriptions of all files. The user of client 104 then sends a second query 150 requesting attributes 161 of resources 106 associated with management module 140. Management module 140 returns the names of the particular attributes 161 associated with each resource 106 along with the properties associated with each attribute 161. Based on the attributes 161 associated with the particular resource 106, the user of client 104 may craft additional queries to cause management module 140 to execute commands, to retrieve tabular data 160, to provide event notification, or to perform numerous other tasks suitable to the type of resource 106.

FIGS. 2A and 2B illustrate example responses, 200 and 202, given by management component 140 based, at least in part, on queries 150 from client 104. Reply 202 in FIG. 2A illustrates an example response to a request to identify resources 106 managed by management component 140. In the depicted example, management module 140 responds with or communicates a name, type, and description for two resources 106, a table named "Files" and a command named "Configure." Moreover, client 104 may send a different query 150, in addition to or in place of the previous query 150, requesting additional detail about attributes 161 of resources 106. Management module 140 replies with a list of attributes 161 for each resource 106 listed along with properties of each attribute 161 and current values for each of those properties. In the depicted example, attributes 161 each have (but not required to have) a property called "Type," which specifies a Java class corresponding to the value of attribute 161, allowing management component 140 to easily interact with Java environments. Other example properties indicate whether the value of attribute 161 is read-only ("ReadOnly"), whether a null value is allowed ("AllowNull"), whether there is a default value for attribute 161 ("DefaultValue"), and what the starting value and increment step are for incremented values ("AutoIncSeed" and "AutoIncStep"). Other example properties shown are 1) an expression upon which the operation of resource 106 depends; and 2) a brief description of each of the properties of attribute 161.

FIG. 3 is a flowchart illustrating an example method 300 for developing a application programming interface in a suitable environment. In certain embodiments, method 300 may represent algorithms executed, at least partially, by server 102. At step 302, types of files, (such as table, command, and event) are defined in a format appropriate for descriptor file 145. The types may be defined in numerous ways such as, for example, identifying how files are routinely used in the environment. Once file types are identified, the attributes of those file types are defined in a format appropriate for descriptor file 145 at step 304. Properties of the attributes are defined in the same format at step 306. From the types, attributes, and properties, descriptor file 145 is constructed at step 308.

To construct management component 140, a user-supplied class (of which management modules 140 will be an instance) is identified at step 310. The user-supplied class is selected to allow management component 140 to interact with environment 100 to provide an interface for clients 104. The definition of management component 140 in the user-supplied class may then be created at step 312. This definition is a constructor that is used to instantiate management components 140. The constructor is invoked to instantiate management component 140 at step 314, which may then function within environment 100 in conjunction with descriptor file 145 for the management of resources 106.

FIG. 4 is a flowchart 400 illustrating an example method 400 representing operation of management module 140. In this example computer-implementable method 400, management module 140 maps a source used in queries 150 to an associated resource 106 at step 402. This allows management module 140 to identify the particular resource 106 that will be managed in response to subsequent queries 150 related to that source. Management module 140 receives query 150 related to one of the associated resources 106 managed by management module 140 at step 404. For purposes of this example, the query types will be limited to filter queries 150 identifying whether management module 140 is capable of applying a filter to retrieved data 160, data queries 150 requesting management module 140 to provide data 160 from resource 106, and execute queries 150 requesting management module 140 to cause or request a task to be executed by resource 106. However, it should be understood that these are only examples of the numerous types of queries 150 that might be issued or executed by clients 104 and method 400 may be modified to respond to any suitable type of query 150, including, for example, any form of query 150 in any SQL described herein.

If query 150 is a filter query at decision step 406, execution proceeds to step 408, at which management module 140 determines if the filter can be applied by management module 140. Based on that determination, management module 140 returns an affirmative response at step 410 if it can apply the filter, or a negative response at step 412 if it cannot apply the filter. This determination is also used to determine whether it is appropriate to apply a filter to retrieved data, as described below.

If query 150 is a data request at decision step 414, management module 140 determines whether to apply a filter at step 416. Filters may be applied by default to certain types of data, or management module 140 may only apply filters if a filter query has been previously received. Management module 140 communicates data 160 (filtered or unfiltered, as appropriate) to client at step 418. If query 150 is an iterative query, management module 140 may iterate through selected material in a requested manner at step 422. Otherwise, execution proceeds to step 430.

If query 150 is an execute request at decision step 424, then management module 140 executes the command at step 426. If query 150 falls into none of the above categories, then management module 140 may perform error or exception processing of query 150. For example, management module 140 returns an exception for syntax error at step 428. Once query 150 is appropriately processed, management module 140 may repeat the method for subsequent queries, as shown by decision step 430. Otherwise, execution of method 400 ends.

The preceding flowcharts and accompanying description illustrate example methods 300 and 400, but numerous other similar or distinct methods could be employed or implemented as well. In short, environment 100 contemplates using or executing any suitable technique or process for performing these and other tasks. In particular, any method of operation suitable for use with any of the embodiments of environment 100 described herein is contemplated within this disclosure. Accordingly, many of the steps in this flowchart may take place simultaneously and/or in different orders than as shown. Moreover, environment 100 may use methods with additional steps, fewer steps, and/or different steps, so long as the methods are consistent with any of the techniques for defining and implementing a management component described or suggested by this disclosure.

Although this disclosure has been described in terms of certain embodiments and generally associated methods, alterations and permutations of these embodiments and methods will be apparent to those skilled in the art. For example, parsing engine 130 and the plurality example of agents 140 may collectively be considered a super-API operable to accommodate a plurality of applications, data resources 106, and clients 104 and provide a single representation of metadata associated with data 160. Accordingly, the above description of example embodiments does not define or constrain this disclosure. Other changes, substitutions, and alterations are also possible without departing from the spirit and scope of this disclosure.

What is claimed is:

1. A computer-implemented method for generating management modules for one or more data resources operating in a plurality of computing environments, comprising:

receiving, at one or more processors of at least one computing device, at least one descriptor file that stores information that classifies a first data resource as a first data resource type and classifies a second data resource as a second data resource type, wherein the first data resource type is described by one or more first predefined attributes, and wherein the second data resource type is described by one or more second predefined attributes, wherein the first data resource type is different from the second data resource type, and wherein the one or more first predefined attributes are different from the one or more second predefined attributes;

receiving, at the one or more processors of the at least one computing device, a user supplied first class that enables a management module to operate in a first computing environment; and generating, by the one or more processors of the at least one computing device, the management module based at least in part on the received user supplied first class and the at least one descriptor file to interact with the first data resource and the second data resource, whereby inversion of control between the management module and the data resource in exposing the at least one of the one or more data resource attributes enables efficient management of the data resource in various computing environments.

2. The computer-implemented method of claim 1, further comprising:

receiving, at the one or more processors of the at least one computing device, a user supplied second class that enables a second management module to operate in a second computing environment; and generating, at the one or more processors of the at least one computing device, a second management module based at least in part on the received user supplied second class and the at least one descriptor file, wherein the second management module interacts with the first data resource and the second data resource in the second computing environment.

3. A computer readable storage medium storing computer executable instructions for generating management modules for one or more data resources operating in a plurality of computing environments, the instructions configured one or more processors when executed to:

receive at least one descriptor file that stores information that classifies a first data resource as a first data resource type and classifies a second data resource as a second data resource type, wherein the first data resource type is described by one or more first predefined attributes, and wherein the second data resource type is described by one or more second predefined attributes, wherein the first data resource type is different from the second data resource type, and wherein the one or more first predefined attributes are different from the one or more second predefined attributes;

receive a user supplied first class that enables a management module to operate in a first computing environment; and generate the management module based at least in part on the received user supplied first class and the at least one descriptor file to interact with the first data resource and the second data resource, whereby inversion of control between the management module and the data resource in exposing the at least one of the one or more data resource attributes enables efficient management of the data resource in various computing environments.

4. The computer readable storage medium of claim 3, further configuring one or more processors when executed to:

receive a user supplied second class that enables a second management module to operate in a second computing environment; and generate the second management module based at least in part on the received user supplied second class and the at least one descriptor file, wherein the second management module interacts with the first data resource and the second data resource in the second computing environment.

5. A system for generating management modules for one or more data resources operating in a plurality of computing environments, the system comprising one or more processing devices collectively configured to:

receive at least one descriptor file that stores information that classifies a first data resource as a first data resource type and classifies a second data resource as a second data resource type, wherein the first data resource type is described by one or more first predefined attributes, and wherein the second data resource type is described by one or more second predefined attributes, wherein the first data resource type is different from the second data resource type, and wherein the one or more first predefined attributes are different from the one or more second predefined attributes;

receive a user supplied first class that enables a management module to operate in a first computing environment; and generate the management module based at least in part on the received user supplied first class and the at least one descriptor file to interact with the first data resource and the second data resource, whereby inversion of control between the management module and the data resource in exposing the one or more first predefined attributes enables efficient management of the data resource in various computing environments.

6. The system of claim 5, the system further configured to:

receive a user supplied second class that enables a second management module to operate in a second computing environment; and generate the second management module based at least in part on the received user supplied second class and the at least one descriptor file, wherein the second management module interacts with the first data resource and the second data resource in the second computing environment.

* * * * *